Feb. 23, 1943.   E. D. COLEMAN   2,311,976
PH MEASUREMENT AND CONTROL DEVICE
Filed Jan. 25, 1939   6 Sheets-Sheet 5
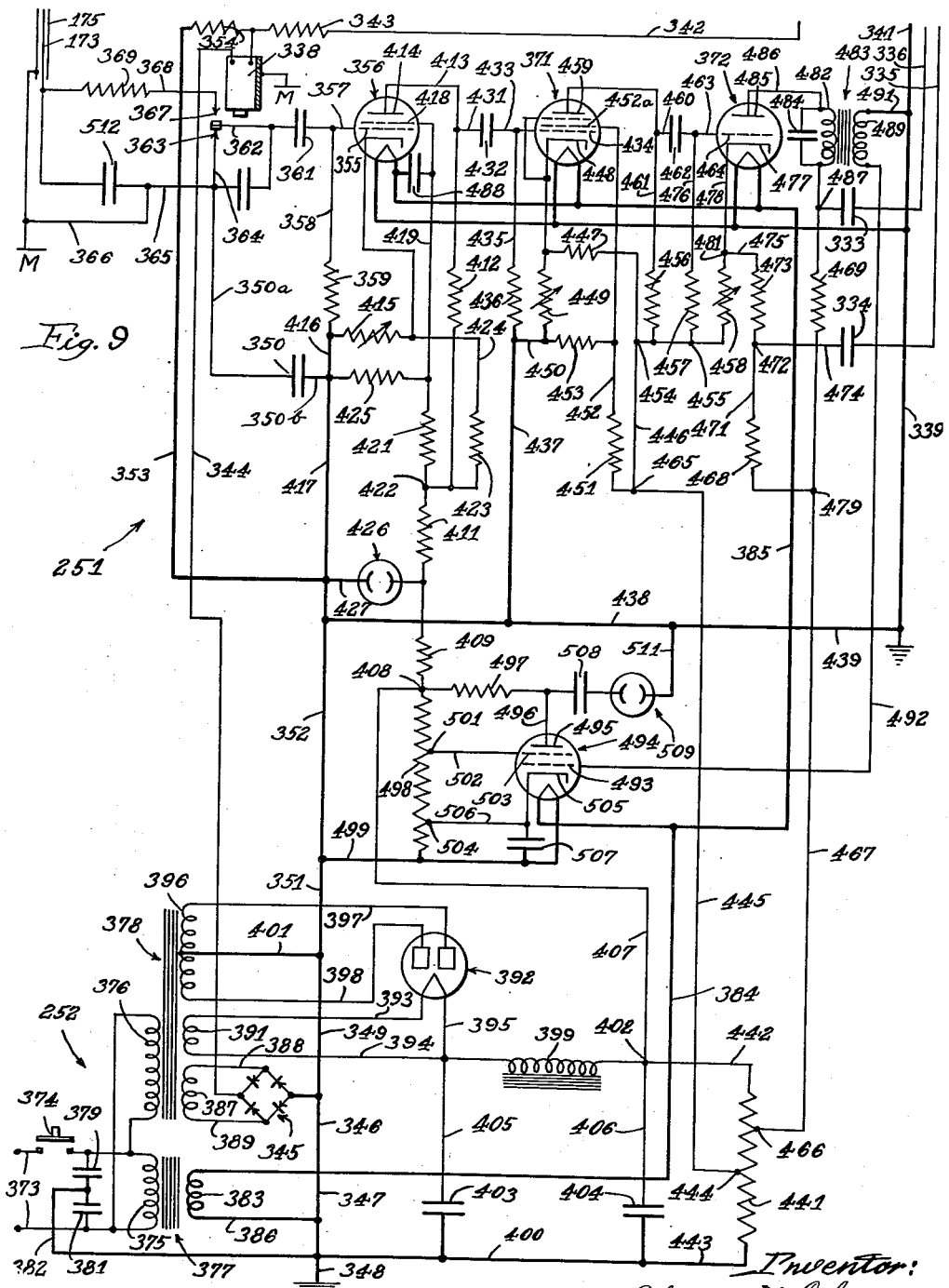
Inventor:
Edwin D. Coleman
By
McCanna, Wintercorn & Morsbach
Attys.

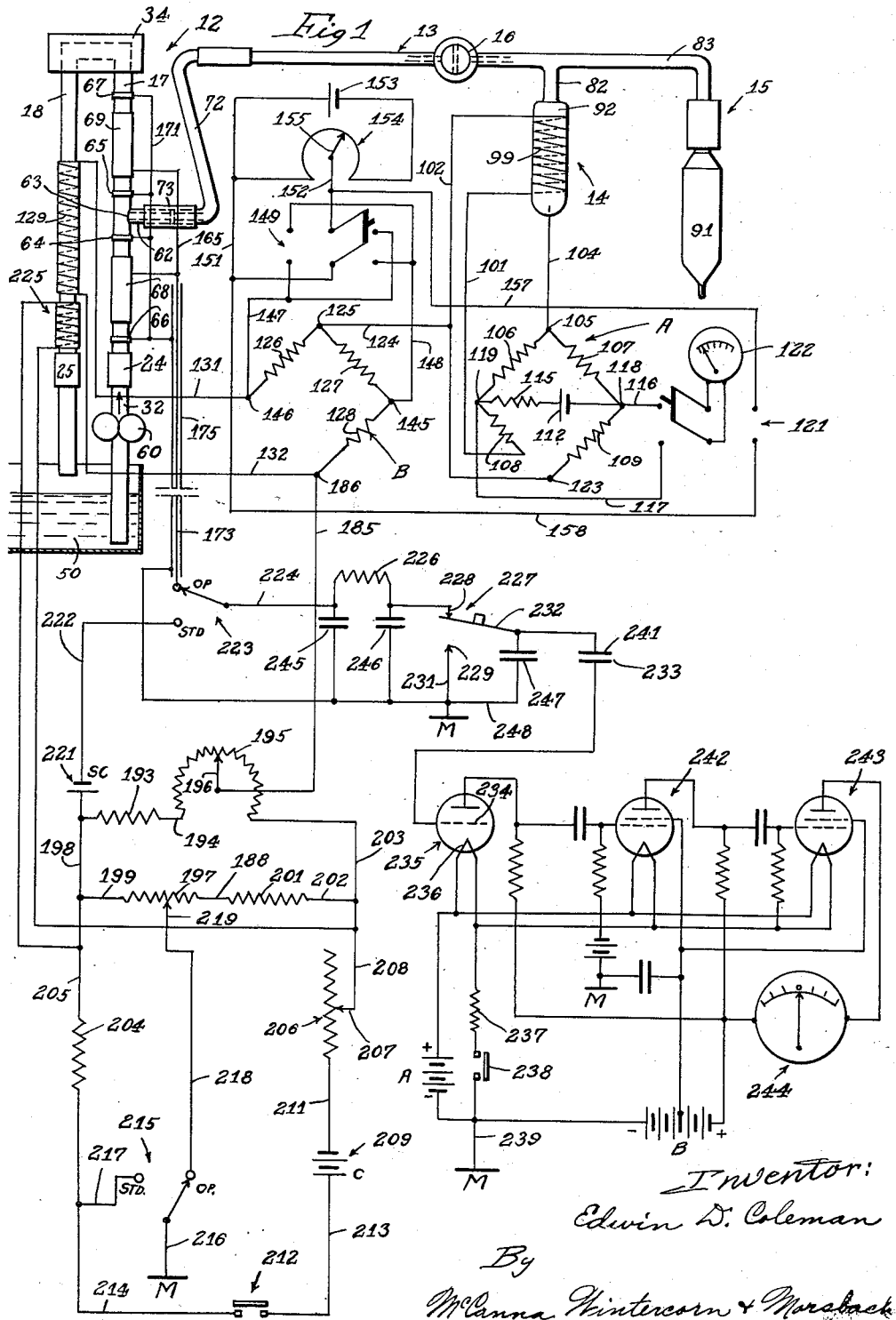

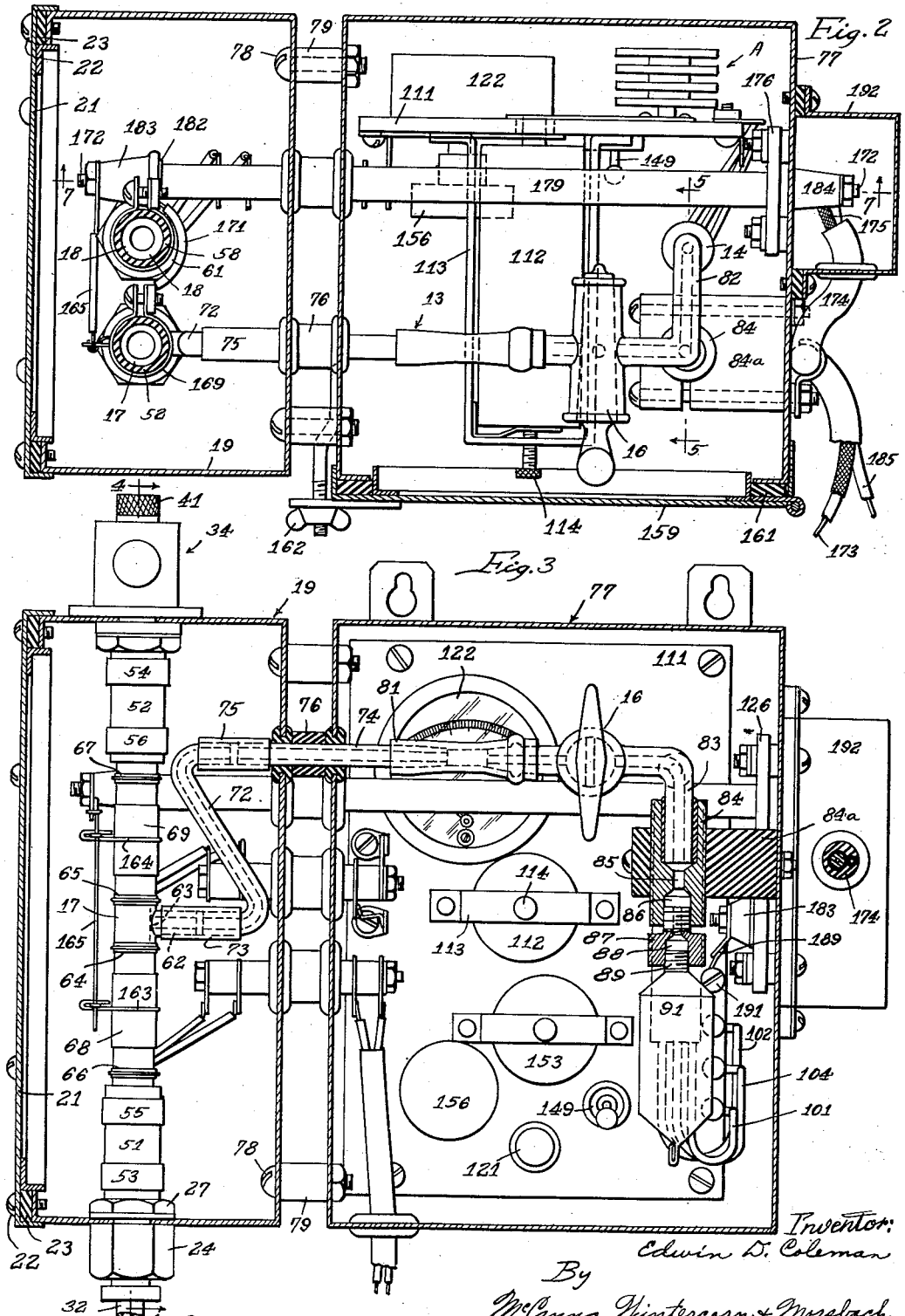

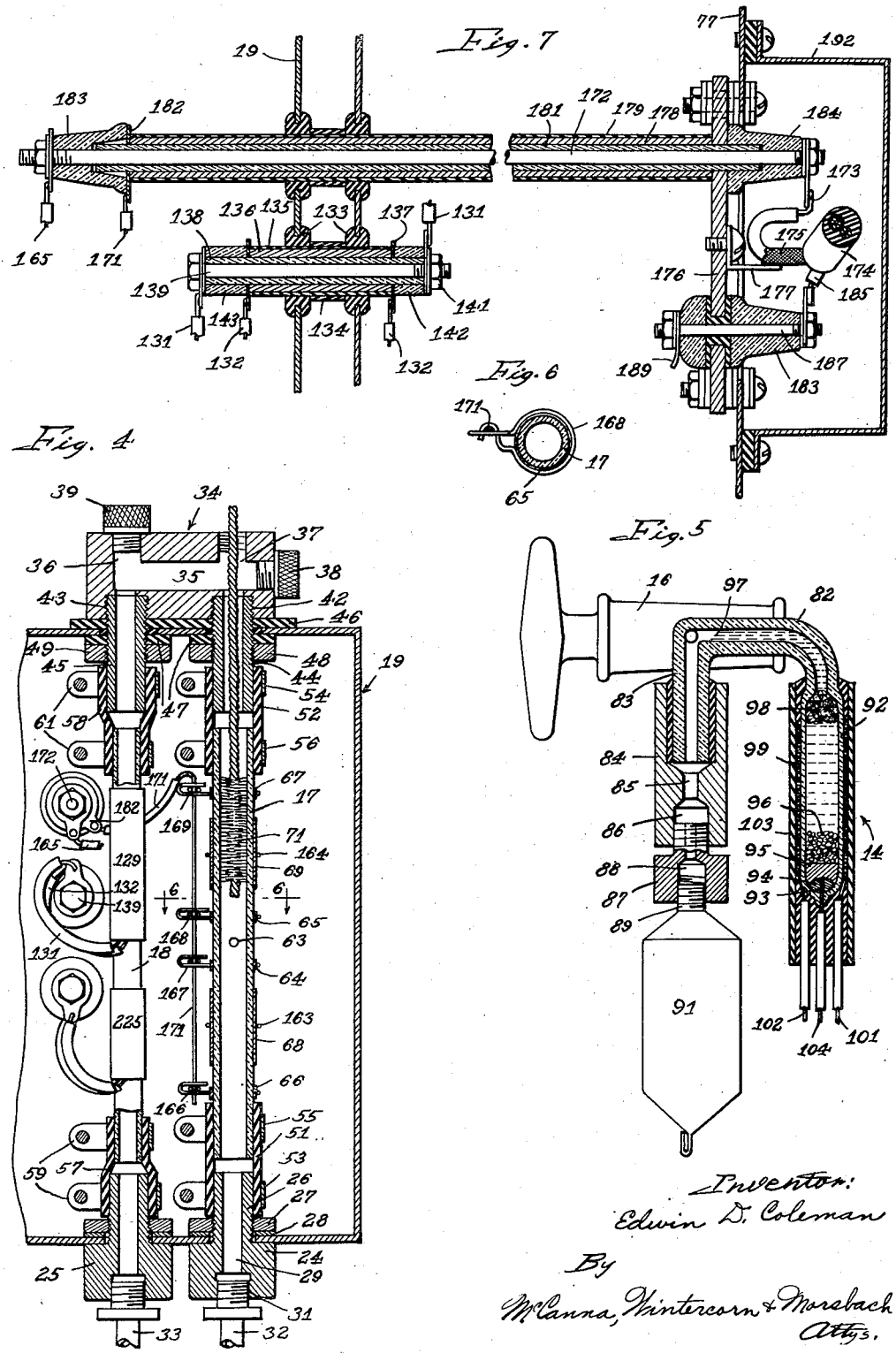

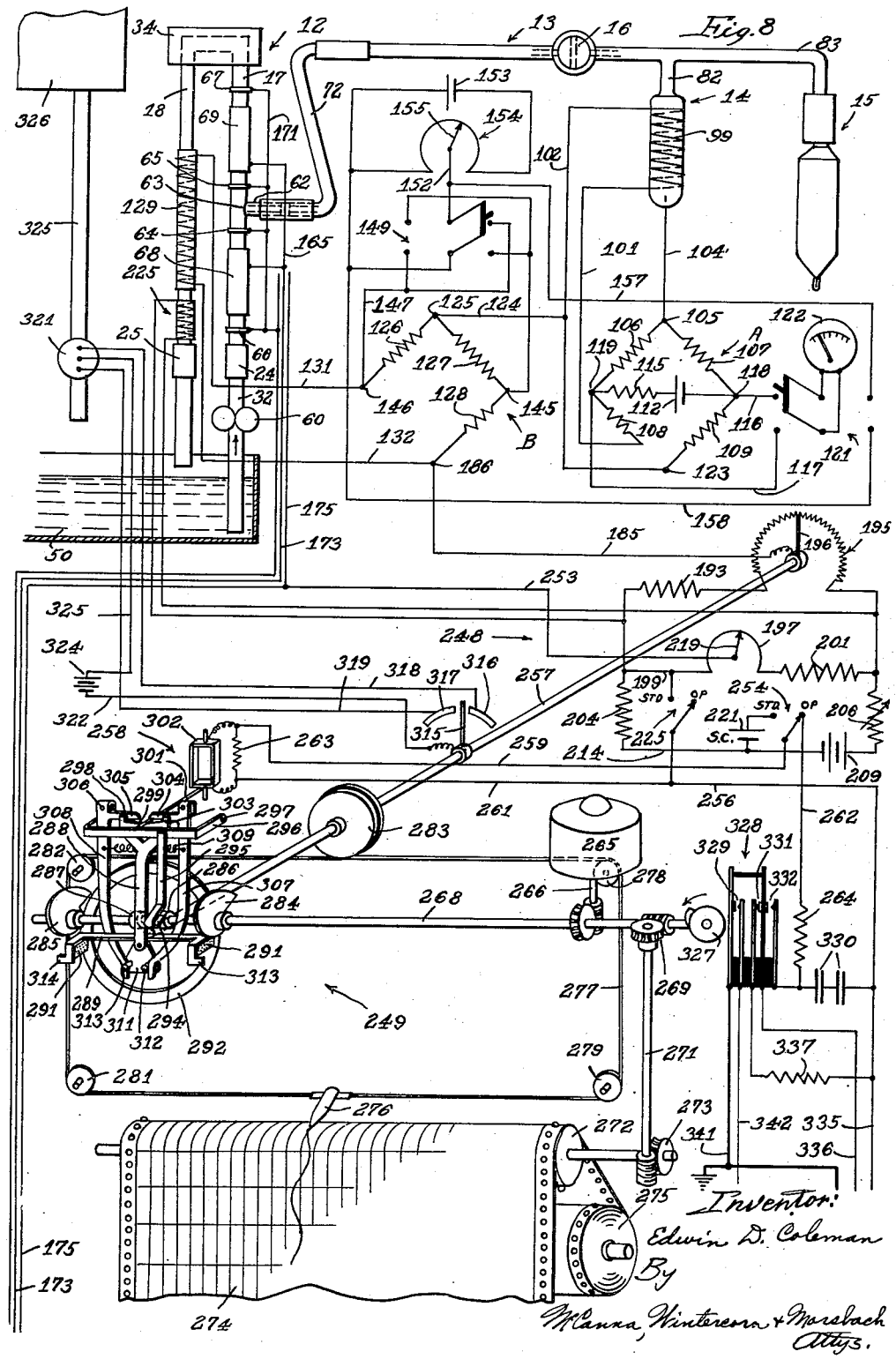

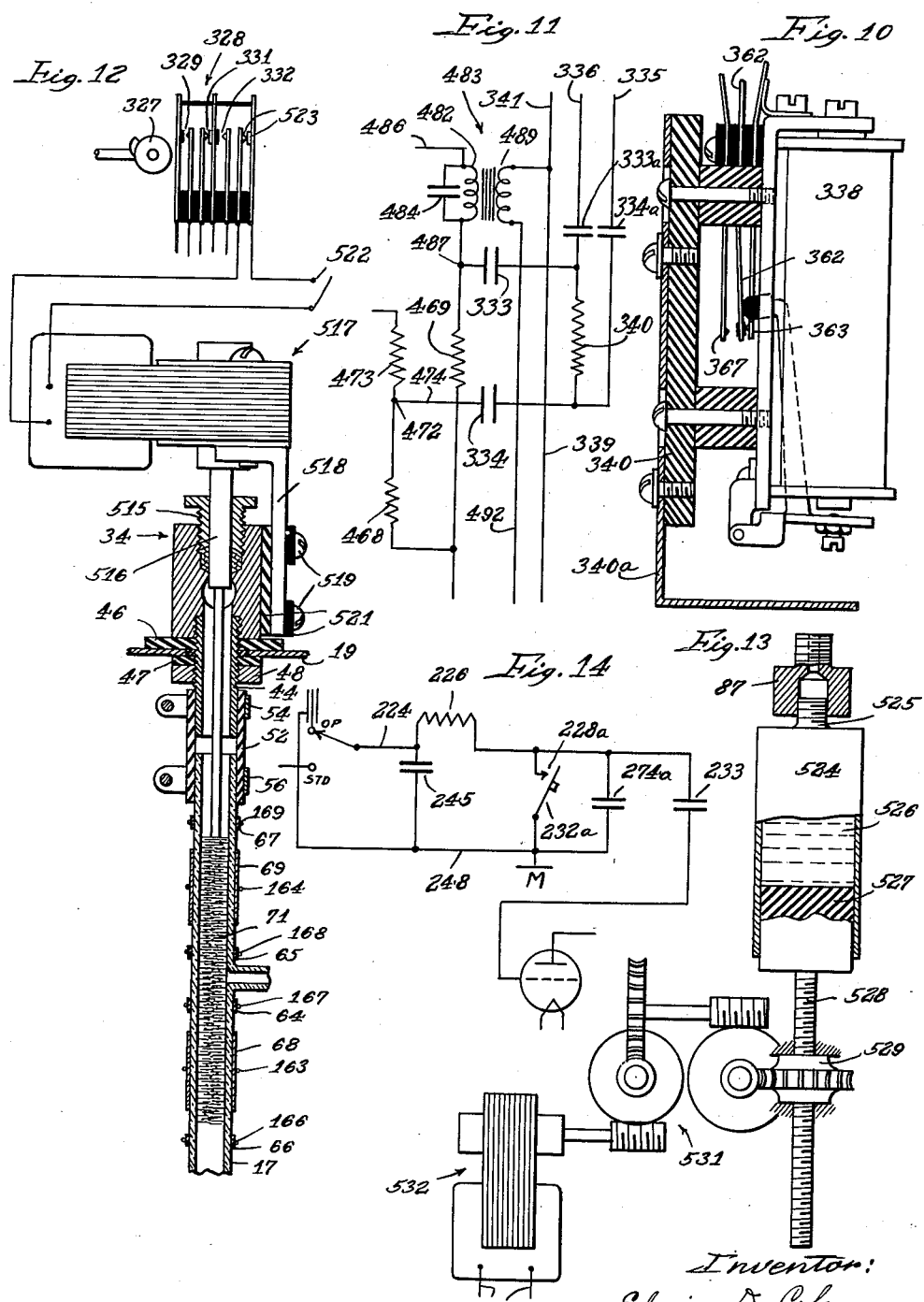

Patented Feb. 23, 1943

2,311,976

UNITED STATES PATENT OFFICE 2,311,976 pH MEASUREMENT AND CONTROL DEVICE

Edwin D. Coleman, Maywood, Ill.

Application January 25, 1939, Serial No. 252,779

30 Claims. (Cl. 175—183)

This invention relates to ion activity measurement and control devices, such, for example, as a hydrogen ion measurement device and parts thereof, and control means actuated thereby.

An object of the invention is the provision of a generally improved device for electrically measuring ion activity which is reliable both for scientific and control purposes and has greater ruggedness, accuracy, and simplicity in operation than similar devices heretofore known, and the combination therewith of improved recording and control means.

Another object of the invention is the provision of an ion activity measuring device having improved test electrode construction.

An object of the invention is also to provide an ion activity measuring device having improved cell chain construction.

A further object is the provision of an ion activity measuring device having improved means for bringing the test electrode and the solution into operative relationship.

Another object of the invention is the provision of an ion activity measuring device having electrodes capable of being easily and readily cleaned at the active surface thereof.

I have also aimed to provide an ion activity measuring device having improved means for eliminating the effects of stray currents between the electrode supports which may interfere with the accuracy of the device.

A further object is the provision of an ion activity measuring device having improved means for supporting the test electrode.

Another aim of the invention is the provision of an electric ion activity measurement device having improved means for producing and for renewing the liquid junction thereof.

I have also aimed to provide an electric ion activity measuring device having improved means for storing the junction material and improved means for dispensing the same.

A still further object of the invention is the provision of an electric ion activity measuring device having improved relationship between the bridge material and the reference electrode.

A still further object is the provision of an ion activity measuring device having improved means for automatically and continuously or intermittently renewing the liquid junction.

Another aim of the invention is the provision of improved means for connecting the cell chain to an electronic amplifier.

A still further object is the provision of an ion activity test device embodying an electronic amplifier wherein means are provided for eliminating stray static interference and allowing operation of the instrument and its accessories without recourse to shielded leads or special shielded compartments.

Another object of the invention is the provision of an ion activity test device wherein improved temperature compensation means is employed for automatically compensating for variations in the temperature of the test solution and electrodes of the cell chain.

A further object of the invention is the provision of an ion activity measurement device having an arrangement to accommodate improved bridge material.

A still further object of the invention is the provision of a bridge material of improved composition, such as to produce improved operating characteristics in a cell chain embodying the same and arranged to facilitate the renewal of the liquid junction either by manual or by automatic means during the operation of a testing device.

I have also aimed to provide a device of the class described having improved amplifying means.

A further object is the provision of improved means for feeding the output of the cell chain to the galvanometer or other measurement device.

A still further object is the provision of an automatic amplifying recorder having improved means for indicating the condition of the system.

Other objects and advantages will appear from the following description and the accompanying drawings, in which:—

Figure 1 is a wiring diagram showing one embodiment of my invention;

Fig. 2 is a horizontal section through the cabinets housing the electrodes and a part of the temperature compensation mechanism;

Fig. 3 is a vertical section through said cabinets;

Fig. 4 is a section on the line 4—4 of Fig. 3;

Fig. 5 is a section on the line 5—5 of Fig. 2;

Fig. 6 is a section on the line 6—6 of Fig. 4;

Fig. 7 is a section on the line 7—7 of Fig. 2;

Figs. 8 and 9 together show the invention as embodied in a pH indicating, recording and controlling device;

Fig. 10 is a section showing the mounting for the relay and switch controlling the input of test potential to the amplifier of Fig. 9;

Fig. 11 is an alternate form of galvanometer feed of Fig. 9;

Fig. 12 is a view of a modified form showing means for continuously cleaning the test electrode;

Fig. 13 is a diagrammatic showing of means for automatically renewing the liquid junction, and Fig. 14 shows a further way of connecting the reference electrode to the amplifier.

I have herein shown and described the invention as embodied in a device for the testing of solutions for pH, but it will be understood that many of the features thereof are not limited to the measurement of this particular property but may be applicable to the measurement and handling of other potentials of small magnitude and for analogous purposes. Two embodiments of the invention are shown, a manually operated pH measurement device shown in Figure 1, and an automatically operating device for indicating and recording the pH of solutions and for controlling the pH thereof shown in Figs. 8 and 9.

The cell chain and the temperature compensation elements are identical in both embodiments, and during the description of these elements reference may therefore be to either Figure 1 or Fig. 8, and the structures shown in Figs. 2 to 7, 12 and 14 are alike applicable to both embodiments of the invention.

Test electrode assembly

Referring first to Figures 1 and 8, the cell chain includes a test electrode assembly designated generally by the numeral 12, a salt bridge 13, a reference electrode 14, and means for maintaining the salt bridge and renewing the liquid junction including the element 15 and the stop cock 16. The structure of the glass electrode assembly is shown more in detail in Figs. 2 to 4, inclusive, and includes a glass electrode tube 17 and a temperature tube 18 (Figs. 1, 4 and 8). It will be understood by those skilled in the art that a metal electrode of suitable metal such as gold, platinum and antimony may be substituted for the glass electrode tube, in which instance the advantages of the mounting and sampling construction would still obtain, the chain then being sensitive to ion species determined by the nature of the sample and of the metal inner surface of the electrode, and where in the claims we use the term glass or test electrode, we also mean such equivalent where applicable. The glass electrode tube 17 and temperature tube 18 are carried within a metal box designated generally by the numeral 19 having a cover 21 secured across one face thereof by means of screws 22 which compress the cover against a rubber or similar seal 23 for the purpose of sealing the interior of the box against the passage of air therethrough for a purpose presently to be described. Secured in the bottom wall of the box 19 are fittings 24 and 25, these fittings each having a hexagonal lower end and a cylindrical upper end 26 passing through openings in the box, the hexagonal lower end abutting against the outer surface of the box so as to prevent passage of air therethrough. The cylindrical upper end 26 is threaded for the reception of a nut 27 for fixing the fitting in place, a lock washer 28 being interposed between the nut and the inner wall of the box, the whole forming a practically airtight connection and providing electrical connection between the fittings and the box. The fittings have internal bores 29 and internally threaded counterbores 31 for the passage of liquid through the fitting and for the reception of inlet and outlet pipes 32 and 33. A further fitting designated generally by the numeral 34, which may be either of metal or of insulation material such as synthetic resin, is positioned against the top wall of the box 19 and has a longitudinal bore 35 extending from one end thereof to intersect a transverse bore 36. A second transverse bore 37 is provided adjacent the open end of the bore 35, and the open ends of the bores 35, 36 and 37 are normally closed by screw plugs 38, 39 and 41 threaded into the bores. The transverse bores 36 and 37 also have threaded counterbores 42 and 43 for the reception of nipples 44 and 45 which project through the top wall of the box 19 (note Fig. 4), insulation 46 and 47 being positioned against opposite sides of the box when the fitting is of metal for the purpose of electrically insulating the fitting and the nipples from the box. The nuts 48 and 49 are threaded onto the nipples and serve to secure the fitting rigidly in position on the box. The electrode tube 17 is supported within the box between the nipple 44 and the portion 26 of the fitting 24, the ends of the tube being in spaced relation to these elements and being secured thereon by flexible rubber sleeves 51 and 52. Metal bands 53 and 54 clamp the rubber sleeves to the fittings, and clamps 55 and 56 likewise clamp the rubber sleeves to the ends of the electrode tube to provide fluid-tight connections of sufficient flexibility so that the electrode tube cannot be strained or will not be broken by sudden shocks either thermal or mechanical. The temperature tube 18 is likewise connected to the nipple 45 and the fitting 25 by means of rubber sleeves 57 and 58 and clamps 59 and 61.

Intermediate the ends of the electrode tube 17 and preferably at the mid-point therebetween is a junction tube 62 joining with the electrode tube through which the salt bridge material is passed to establish the usual liquid junction with the contents of the electrode tube, this junction being formed at the point indicated by the numeral 63. Equally spaced from the point 63 are guard rings 64 and 65 on opposite sides of the point 63 and guard rings 66 and 67 equally spaced from the guard rings 64 and 65. Interposed between the guard rings 64 and 66 and the guard rings 65 and 67 and equally spaced therefrom are contact layers 68 and 69. I have found that intimate contact between the surface of the glass tube and the metal coating forming the guard rings and contact layers is imperative for consistently good results. This contact may be secured, for example, by thermally dispersing a metal such as silver over the glass surface preferably by spraying thereon. The characteristics of the metal are, however, exceedingly important if any material thickness is applied, since the film apparently puts the glass in a condition of stress. I have found that minimum asymmetry potentials are developed and superior stability occurs if lead is applied and is applied by the spray method. I have also used tin, brass, steel, zinc, and other metals, and have found that the performance appears to improve as the metal becomes softer. I have also employed silver and gold, applied chemically, both of which worked well but were difficult to apply. Woods metal may also be employed where the temperatures of the solution are sufficiently low.

The solution under test is circulated through the interior of the electrode tube 17, as for example, from a tank 50 by means of a pump 60, the solution passing through the fitting 24, the electrode tube 17, the nipple 44, the fitting 34, the nipple 45, the temperature tube 18, the fitting 25, and thence back to the tank 50 or to some other point of disposal as circumstances may require. The fittings 24 and 25 are in good electrical contact with the metal box 19 so that these fittings are always at substantially the same potential and represent the only points at which the system is in electrical contact with the box, since the fitting 34 and the nipples 44 and 45 are carefully insulated from the box. Accordingly, if there is a difference in potential between the fluid lines delivering sample to fitting 24 or receiving sample from the fitting 25, this difference in potential is largely dissipated by current flow between the fittings 24 and 25 through box 19, and there is a minimum of current flowing through the solution in the electrode tube, the fitting 34 or the temperature tube 18. I have found this to be important as a means of eliminating serious errors. Furthermore, I have found that by insulating fitting 34 from the box 19 any difference in potential between the solution within the fitting 24 and within the fitting 25 exerts much less error than would occur if fitting 34 were in electrical contact with the box 19. It appears that no two fittings can be made having exactly the same potential with respect to the solution, and consequently there will always occur some flow of current traversing the column of fluid within the electrode tube. When, however, the fitting 34 is insulated, the two electrodes constituting the cell which generates this current will be fittings 24 and 25 and the electrolyte path becomes very long. Further, I have found it desirable though not essential that temperature tube 18 be made of somewhat smaller diameter than the electrode tube 17 so that most of the IR drop will occur within the liquid in temperature tube 18 rather than within the liquid inside the electrode tube. It will be clear that the resistance of the fluid column within the temperature tube may be increased to any desired degree either by increasing the length or decreasing the bore of said temperature tube, and that the effect of the galvanic current in the electrode tube may thus be reduced to a satisfactory minimum. Further, it will be clear that the temperature tube not only may act as a support for the temperature compensating resistance coils but also may fulfill the even more important role of limiting said galvanic currents. I use the descriptive term "temperature tube" independent of whether the tube fulfills either or both of said functions. The difference in potential between the fittings 24 and 25 and the solutions contacting the same can be largely eliminated if these fittings are made from pieces of metal immediately adjacent each other in the same bar, and can be further reduced by using approximately the same cutting action in boring the two pieces and in facing the inner surfaces of the same which are exposed to the fluid. Thus by using care and skill in the design and construction of the fittings 24 and 25, the error from this source can be almost completely eliminated.

In order to further reduce the effects of this transverse current through the electrode tube, I have found it desirable to make liquid junction with the liquid in electrode tube 17 at the point 63 and to symmetrically space the contact layers 68 and 69 with respect to the liquid junction at 63 whereby the effect of the transverse current on one of these contact layers is substantially compensated by the effect of the current on the other thereof. In other words, if the drop in potential between the liquid junction 63 and the electrode layer 68 is positive, the drop between the liquid junction 63 and the electrode layer 69 will be negative and very nearly of the same magnitude. The result is almost perfect compensation so that when this construction is coupled with symmetrical members 24 and 25 and with the use of a restricted bore in the temperature tube 18, the effect of the unavoidable galvanic currents generated between the fittings 24 and 25 and the contacting liquids becomes practically negligible so far as the operation of the device as a pH or analogous measuring instrument is concerned.

The plugs 38, 39 and 41 permit of access to the bore of the electrode tube and the temperature tube and to the bore 35 and allows insertion of a cleaning brush designated generally by the numeral 71 so that the surfaces of these bores may be readily freed from any adherent deposits or clogging which might occur therein. This is desirable particularly with respect to the electrode tube, since it has been found that certain suspended materials tend to deposit and adhere to the active surface of the electrode tube and thus cause the response of the electrode to become sluggish. When such a condition arises in an automatic pH controller, the period of response in the instrument may be so far delayed that automatic control becomes almost impossible. Similar deposits within the temperature tube 18 likewise retard the temperature response and also render the instrument inaccurate. The brush 71 may be periodically inserted in the bores of the tubes for manual cleaning thereof, but I have also found that the cleaning brush may be left permanently in place and the rod therefrom brought out through the bore 17 through a suitable stuffing box (not shown). If desired, the cleaning brush may be driven with a reciprocating or rotary motion by means of a small electric motor so as to continuously clean the active surface of the electrode tube when handling stubbornly adhering deposits, as shown in Fig. 12.

*The salt bridge and reference electrode*

Liquid junction with the sample within electrode tube 17 is established at the point 63 by means of a column of conducting material, preferably a semi-plastic material such as agar gel, presently to be described more in detail. In this instance, this column of conductive material includes the tube 62 connected to a tube 72 by means of a rubber sleeve 73 which is in turn connected to a tube 74 by means of a rubber sleeve 75, the tube 74 extending through a rubber grommet 76 positioned in the back wall of the box 19 and in the side wall of a metal housing 77, the metal housing 77 being attached to the box 19 by means of screws 78 and spacers 79. The tube 74 is connected to the stop cock 16 by means of a rubber sleeve 81 which is connected to the source of bridge material 15 and to the reference electrode 14 by means of tubes 82 and 83, this system of tubes forming the conductive column or salt bridge 13. The salt bridge tube 13 is substantially filled with the bridge material which constitutes an electrical conductor between the liquid junction at 63 and the reference electrode 14. The stop cock 16 is normally closed, but a layer of bridge material is inevitably produced about the bore of the stop cock in response to the turning of the cock, and maintains electrical communication through the cock. The free end of the tube 83 carries a fitting 84 supported in an insulating block 84a and having a bore 85 communicating with the interior of the tube 83, and a threaded counterbore 86 threaded to receive an adapter 87 which is also provided with a bore 88 adapted to receive the threaded dispensing end 89 of a conventional collapsible tube 91. The bridge material is carried in the tube 91 and is dispensed through the bore of the adapter 87 and the bore of the fitting 84 into the tube 83. This arrangement is of considerable merit because of the difficulty of attaching the collapsible tube 91. I have found that because of the nature of the threads on the dispensing end 81 of tubes of this character, which are commonly made of soft metal such as lead, extreme difficulty is encountered in threading the tube into position. I have therefore provided the adapter 87 which is screwed onto the end of the tube prior to attachment into the fitting 84 and the adapter is subsequently screwed into the counterbore 86, thus permitting the adapter to be applied to the tube in the open where greater care and accuracy can be obtained in the fitting of the parts.

The bridge material is exposed to the sample in the electrode tube 17 at the point 63, and as this surface continues to be so exposed, the concentration of KCl or other salt contained in the bridge material is gradually reduced until eventually appreciable error would be developed at 63 unless means were provided for replacing this surface with a fresh surface of bridge material sufficiently rich in KCl. This is accomplished by opening the cock 16 and then compressing the tube 91, thereby forcing bridge material from the tube into the salt bridge tube 13, discharging an equivalent amount of the exhausted bridge material at the point 63 from whence the exhausted material is rejected from the electrode tube with the flow of sample therethrough. The cock 16 is closed during normal operation so that in the event of excessive fluid pressure in the electrode tube, this excessive pressure cannot be relieved by driving the bridge material back into the collapsible tube 91 or into the reference electrode 14.

The reference electrode is formed directly on the end of the tube 82 (see Fig. 5) and consists of an elongated glass bulb 92 having sealed in the bottom thereof a platinum or other suitable electrode 93 immersed in mercury 94 covered in turn with a layer 95 comprising a mixture of calomel and KCl. Positioned thereabove is a solution 96 consisting of saturated KCl solution which fills the bulb and extends through the bore of the tube 82 to approximately the point 97 where contact is made with the bridge material. At the point where the bulb joins the tube 82 a small piece of glass wool 98 is fused into the wall of the electrode bulb to prevent the mercury from flowing into the tube 82, thus escaping from the bulb. The glass wool further functions to prevent granules of the bridge material from passing through the tube 82 and falling into the electrode proper. This assembly constitutes a novel type of saturated calomel half cell, but it will be understood that my invention is not limited to any particular form of half cell, but also contemplates in certain phases the use of half cells of other types, such as the unsaturated calomel half cell or other half cells well known in the art, or similar devices for producing substantially constant potential between a metallic conductor and a fluid. It will be seen that I have not only provided a novel form of reference electrode, but in addition, novel means for re-making the liquid junction, and this, in combination with the use of a sealed reference electrode, constitutes a highly improved and simple procedure for replacing the liquid junction without danger of contaminating the reference electrode and with a minimum of difficulty, time and effort. I have also provided novel means for storing a reserve supply of bridge material, and novel means for replacing the supply.

*Compensation for change of pH of test solution with change in temperature thereof*

It is known that practically all solutions undergo changes in pH with change in temperature, and therefore, unless some correction is made the pH indicating instrument will be responsive both to the pH of the sample and the temperature thereof, even though perfect thermodynamic correction is applied to the remainder of the electrical system under the well recognized equation $$E = \frac{RT}{nF} \times pH$$

According to my invention, means are provided which can be adjusted to fit practically any type of sample solution and to bring about correction for this temperature effect over reasonable pH ranges so that the ultimate reading of the pH instrument will be substantially independent of the temperature of the sample and will indicate the pH that this sample would have were it at the normal pre-selected temperature instead of indicating the actual pH of the sample at the temperature of the test.

In order to effect compensation for variation in temperature of the sample and for variation in temperature of the reference electrode, two temperature compensating circuits are employed, designated generally in Figs. 1 and 8 by the letters A and B. The reference electrode is surrounded with a resistance coil 99 (Fig. 5) having leads 101 and 102, and over the entire assembly is mounted a protective sheath 103, the resistance coil 99 being temperature sensitive. A lead 104 connects to the platinum terminal 93 of the reference electrode and constitutes one terminal of the cell chain consisting of the reference electrode and the glass electrode, as will presently more fully appear. The lead 104 from the reference electrode is connected at the point 105 to a network comprising resistances 106, 107, 108 and 109 and the temperature sensitive coil 99, the former being mounted on a plate 111 within the housing 77 and constituting a Wheatstone bridge fed by a battery 112 likewise secured to the plate 111 by means of a bracket 113 having a thumb screw 114 for easy replacement thereof. A resistance 115 is interposed between one side of the battery and the bridge. Conductors 116 and 117 connect intermediate points 118 and 119 of the bridge to a double-pole, double-throw switch designated generally by the numeral 121 for determination of the potential input to the bridge by meter 122, the switch and meter being supported on the board 111. These resistances are so proportioned that the bridge is substantially in balance at a predetermined temperature such as 25° C., and as the temperature at the temperature responsive coil 99 varies from 25° C. there is developed between the point 105 and the opposite side 123 of the bridge, a difference in potential substantially equivalent to the increment in potential occurring in the cell chain by virtue of the temperature change of the reference electrode. In this particular instance the condition is met when resistances 106, 107 and 109 are wound from manganin wire and are 500 ohms each while resistance 108 is 400 ohms of the same wire and temperature responsive resistance 99 consists of a nickel coil having a temperature coefficient of substantially 0.005 and a resistance of substantially 100 ohms at 25° C.

The Wheatstone bridge circuit A is therefore in series with the reference electrode. Connected to the lead 102 and thence to the point 123 of this bridge circuit is a conductor 124 connected at point 125 to the second Wheatstone bridge circuit B comprising resistances 126, 127, 128 and 129, the resistance 129 being wound on the temperature tube 18 and being in this particular instance of nickel wire of approximately 0.005 temperature coefficient and having a resistance of 500 ohms at approximately the temperature at which the sample will normally be. The other resistances are temperature insensitive coils, in this instance of 500 ohms each. Means are provided as heretofore described for the ready removal of the temperature tube 18 so that a suitable value for the resistance 129 may be selected for the particular temperature at which the instrument is intended to operate and so that the resistances may be readily interchangeable. Conductors 131 and 132 connect the temperature responsive coil 129 to the remainder of the bridge and include a connector member for conducting the current from the housing 77 to the box 19. This includes rubber grommets 133, a spacer 134 of insulation material within which is provided a tube of insulation material 135 carrying a smaller tube 136 of metal contacting at its ends with plates 137 on the ends of the conductor 132. Within the metal sleeve 136 is an insulating tube 138 carrying a threaded rod 139 having nuts 141 for attachment of the ends of conductor 131, the conductors being separated by spacers 142 and 143.

The latter Wheatstone bridge circuit is fed at the points 145 and 146 through conductors 147 and 148 connected to a polarity reversing switch designated generally by the numeral 149, this switch being fed through conductors 151 and 152 from a battery 153 and a voltage divider 154 having a movable slider 155, actuated by a knob 156 carried on the panel 111. It will be seen that the position of the slider 155 will fix the potential applied to the bridge so that the degree of response of this network with respect to the temperature at the coil 129 is adjustable both as to magnitude and as to polarity. Conductors 157 and 158 connect the polarity switch 149 to the switch 121 in such manner as to measure on the volt meter 122, the potential being applied to the second bridge circuit, that is, the circuit designated B, whereby the reading of this meter becomes a measure of the temperature response of said bridge. The purpose of this bridge is to compensate for changes in the pH of the sample with change in temperature. By properly adjusting slider 155 it is also possible to adjust the circuit so it compensates not only for change in pH of the sample with temperature, but will also compensate for any theoretical change in a normal hydrogen electrode at solution temperature.

Referring now more particularly to Figs. 2 and 3, the batteries 112 and 153 are shown mounted on the panel board 111. The voltage divider knob is indicated at 156, and the polarity reversing switch at 149; the switch 121 is shown as a push button normally connected to conductors 157 and 158, but connecting the meter 122 to the conductors 116 and 117 when depressed, thereby permitting momentary checking of the potential delivered from the battery 112. While the potential of battery 112 may vary somewhat, it is permissible from a practical standpoint to allow some variation in the potential thereof without introducing serious errors in the measuring circuit, since the temperature correction to the reference electrode is small in any event, and by means of the button 121 the potential of the battery may be readily measured at any time and the battery replaced when necessary. In the released position, with the meter 122 connected to the conductors 157 and 158, the meter continuously indicates the degree of correction being applied by bridge B, and by means of the voltage divider 154 this correction can be periodically re-set as the battery 153 gradually fails.

Attention is now directed more particularly to the manner in which the above-described elements are assembled, shown in detail in Figs. 2 and 3. It will be noted that the electrode tube 17 and the temperature tube 18, together with their directly associated parts, are assembled within the box 19. It will be realized that the sample being circulated through the electrode tube and temperature tube may be at temperatures substantially different from room temperature, and since the temperature of the sample may vary to a considerable extent, I have found it desirable to thermally isolate the reference electrode from the region in which the temperature of the sample may exert any material effect. This is accomplished by mounting the electrode tube and the temperature tube within the box 19 and by providing the cover 21 and the gasket 23 to substantially hermetically seal the box. Furthermore, space is provided within the box for the reception of an open container of a desiccant such as fused calcium chloride, hydrous calcium sulphide, sulphuric acid, or other desiccant to substantially free the air within the chamber from moisture. This is of particular importance where cold solutions are being passed through the electrode tube since otherwise condensation of moisture occurs on the outside of the glass electrode that may seriously interfere with the operation of the instrument because of short circuits between the various parts thereof. Furthermore, the arrangement is such that all adjustments and the cleaning of the electrodes is possible without entering the box 19. The electrical conductors and the salt bridge are brought through the box through rubber grommets which serve to seal the openings thereabout and prevent infiltration of moisture. The housing 77 is provided with a door, as indicated at 159 (Fig. 2) provided with a gasket 161 and secured in place by a wing nut 162 which may be opened to allow immediate access to the interior thereof for making adjustments in the electrical circuit as heretofore indicated.

In order to conduct the current from the glass electrode tube to the measuring instrument, wire loops 163 and 164 extend around and in intimate contact with the contact layers 68 and 69 and are engaged by a conductor 165 (Fig. 3). Wire loops 166, 167, 168 and 169 (Fig. 4) likewise engage the guard rings 64, 65, 66 and 67 and are interconnected by a conductor 171 (Fig. 4). The conductor 165 is connected to a metal rod 172 which extends from the interior of the box 19 through the housing 77 as shown in Fig. 7, the opposite end thereof being connected to a lead 173 from which circuit is completed to the measuring instrument through a cable 174, the lead 173 having a shield 175, so designed that the potential of the shield 175 is at the same potential as the lead 173 when the potentiometer of the measuring circuit balances that of the cell. The shield 175 is connected to a conducting plate 176 through a terminal 177. Mounted to the plate 176 and in electrical contact therewith is a metallic tube 178 protected from contact with outside sources by an insulating sleeve 179 and insulated from the rod 172 by a glass tube 181. The metallic tube 178 makes contact with a metallic washer 182 within the box 19 to which is connected the conductor 171 to which the guard rings are in turn electrically connected, these elements forming part of the so-called McClure circuit, which will presently be more fully described. Ceramic insulators 183 and 184 are in contact only with the conductor 171 or with regions at the same potential as the conductor 173 and the shield 175, and therefore, no leakage can occur from the ceramic insulators due to surface leakage when the cell changes potential balance because there exists no difference of potential between the conductor 171 or the lead 173 and the adjacent portions of the McClure circuit including the elements 182 and 176. It is thus possible to connect the glass electrode to the measuring device through the shield 175 without in any way disturbing the potential of the glass electrode lead including the conductor 165, the rod 172 and the lead 173 by stray electrical leakage, and it is further possible to extend the cable 174 for distances of several hundred feet, since a cable of this construction cannot leak to the conductor 173 when used in the electrical circuits herein described.

The purpose of the guard rings 64 to 67, inclusive, is to prevent electrical leakage along the surface of the glass tube. These four guard rings are connected together and to the McClure circuit, and hence, since the potential of this circuit is the same as that of the contact layers 68 and 69 of the glass electrode at the point of balance, there can occur no leakage from the contact layers along the surface of the glass tube.

*Potentiometer assembly and thermodynamic temperature compensation of Figure 1*

The temperature compensation heretofore described functions to correct for the actual change in pH of the sample which occurs with change in temperature, and to cause the instrument to read the pH which the solution would have had were it at the normal temperature instead of the actual pH existing in the sample at the temperature at which the test was conducted, and which would be read by the instrument in the absence of such correction. In contrast to this, the function of the thermodynamic temperature correction hereinafter described is to cause the instrument to show correctly the pH of the solution at the existing temperature as defined by the equation $$E = \frac{RT}{nF} \times pH$$

Connection is made to the reference electrode through a conductor 185 (Fig. 1) connected to the circuit of the Wheatstone bridge B at 186, the preferred manner of making this connection being shown in Fig. 7, the conductor being preferably enclosed within the cable 174 and being connected to a rod 187 in a ceramic insulator 188 carried on and insulated from the plate 176. A conductor 189 within the housing 77 connects to a binding post 191 on the control board 111 (Fig. 3) and thence to the point 186 of the bridge circuit. A cover 192 on the side of the housing 77 covers the insulators 183, 184 and the respective connections. The potential generated by the cell chain and impressed on the conductors 173 and 185 is measured by means of a potentiometer assembly shown in Fig. 1, in which the potentiometer circuit is designated by a resistance 193 connected by a conductor 194 to a potentiometer resistance 195 having a slider 196, to which the conductor 185 from the reference electrode is electrically connected, a variable resistance 197 connected to the resistance 193 by means of conductors 198 and 199, a resistance 201 connected to the potentiometer resistance 195 by conductors 202 and 203 and to variable resistance 197 by a conductor 188, a resistance 204 connected to the conductor 198 by means of a conductor 205, a variable resistance 206 having a slider 207 connected to the conductor 203 by means of conductor 208, a battery 209, one terminal of which is connected to the resistance 206 by means of a conductor 211, a switch 212, one side of which is connected to the other terminal of the battery 209 by a conductor 213, the opposite side of which is connected to the resistance 204 by a conductor 214, a switch 215 having two positions indicated by the letters Std. meaning Standardized, and the letters Op. meaning Operate, the Std. position connecting a McClure circuit indicated by the numeral 216 either to the conductor 214 by way of conductor 217 or to conductor 218 attached to the slider 219 of variable resistance 197. A standard cell 221 is connected to conductor 198 and has a lead 222 connected to a switch 223 through a contact marked Std. and having the mentioned significance, the switch serving to connect a conductor 224 either to the conductor 222 from the potentiometer assembly or the conductor 173 leading from the glass electrode. The conductor 224 is connected to the amplifier or other voltage detecting device presently to be more fully described, but which functions for the purpose of determining when the potentiometer assembly is brought into electrical balance with the cell chain. The standard cell 221 is connected to oppose the potential of resistance 204, and in balancing the bridge, the two potentials are exactly balanced by moving slider 207 of resistance 206, the point of balance being indicated by the amplifier assembly presently to be described. In parallel with the series connected resistance 193 and potentiometer 195, a further resistance 225 is connected consisting of a temperature sensitive coil connected to conductors 205 and 208 of the potentiometer circuit, the coil 225 being positioned on the temperature tube 18 and being thermally responsive thereto. As the resistance of coil 225 changes with temperature, the potential drop between conductors 205 and 208 will alter, providing the potential drop through resistance 204 is constant. I have found, by way of specific example, that if the combined resistance between the conductors 205 and 208 of the network including the resistance 193, potentiometer 195, variable resistance 197, and resistance 201, is approximately 100 ohms, and further, if the coil 225 is wound from nickel wire of temperature coefficient of 0.005, then if the resistance of coil 225 is 46.8 ohms at 25° C., the potential drop between the conductors 205 and 208 will follow closely the absolute temperature of the temperature tube 18, that is, it will follow the equation $$E = \frac{RT}{nF} \times pH$$

Furthermore, if the resistance 206 and the potential of the battery 209 are made large, the effect of change in resistance at the coil 225 on the change in current through the resistance 204 becomes so small that negligible error occurs even when no change in adjustment is made at the variable resistance 206 over wide changes in temperature at the temperature tube. Thus, this potentiometer assembly becomes responsive to the temperature of the sample according to thermodynamic requirements.

When the potentiometer circuit is balanced or standardized, the switches 215 and 223 are moved to the operate position and the potential of the cell chain is then opposed to the potential between the point of the slider 196 and the point of the slider 219. By moving slider 196 a point can be reached on the potentiometer at which these two potentials exactly balance out as indicated by the amplifier assembly, and the potentiometer 195 being calibrated in therms of pH, the pH of the solution can be read directly therefrom. It will be noted that as the temperature of the sample varies and the potential of the cell chain changes in accordance therewith, the potential between the slider 219 and the slider 196 will alter in the same manner so that the instrument reading will be substantially constant, irrespective of temperature changes in the sample, provided there does not occur a concurrent change in the pH of the sample.

Where the cell chain consists of a saturated calomel half cell coupled with a glass electrode consisting of Corning 015 glass having a contact layer of lead, its potential will be reasonably close to zero at zero pH, under which conditions the slider 196 would be at the extreme end of the potentiometer resistance adjacent to the resistance 193. The value of resistance 197 is then made to be approximately twice that of resistance 193 so that it is possible to apply either a positive or negative asymmetry correction. The purpose of potentiometer 197 and slider 219 is to apply to the potentiometer circuit a fixed increment sufficient to compensate for the asymmetry potential of the glass electrode, while the purpose of resistance 193 is to balance the potential range of the potentiometer 195 to coincide with the potential range of the glass electrode cell chain.

*Amplifier of Fig. 1*

The impulse amplifier shown in Fig. 1 functions to determine the condition when the potential of the potentiometer assembly is equal and opposite to that of the cell chain and for the purpose of standardizing the bridge, depending upon the position of the switches 215 and 223, the procedure so far as the amplifier is concerned being identical. Assuming the switch to be in the Operate position, the glass electrode lead 173 is then connected to the conductor 224 to which connection is made through a resistance 226 to a switch 227 having a contact 228. Contact 228 is accordingly in series with the cell chain by way of conductor 173 through the glass electrode, through the liquid junction and the salt bridge 13 to the reference electrode 14, thence through the temperature correction bridges A and B, thence through conductor 185 to the potentiometer 195, from the potentiometer 195 to the slider 219 of resistance 197 and from slider 219 through switch 215 to the McClure circuit. The opposite contact 229 of the switch 227 is likewise connected to the McClure circuit by conductor 231. The switch 227 has a movable switch blade 232 connecting through a condenser 233 to the grid 234 of a vacuum tube 235. The filament 236 of this tube is also connected to the McClure circuit through a resistance 237, a switch 238 and a conductor 239.

It will be apparent that if the potential between the sliders 219 and 196 is not equivalent to the output of the cell chain as modified by the temperature compensators, there will be a difference in potential between contacts 228 and 229. Switch blade 232, normally engages contact 229 and when moved from this position to engagement with contact 228, if such difference in potential exists, there will be a change in potential on element 241 of the condenser 233, and this will be transferred and expressed as a pulse or change in potential on the grid 234 of vacuum tube 235. On the other hand, when the potential between the sliders 196 and 219 of the potentiometer assembly is equal and opposite to that of the cell chain as modified by its temperature compensators, contacts 228 and 229 will be at the same potential, and under these circumstances switch blade 232 may be moved from engagement from contact 229 to 228 without affecting the potential of the grid 234. The vacuum tube 235 is resistance connected as the first step in a cascade including additional tubes 242 and 243 arranged as will be apparent from the drawings, and in the plate circuit of the third tube 243 of this cascade a meter 244 is connected. It will be seen that as the potential of the grid 234 of the first tube is altered by movement of the switch blade 232, the change will be reflected on the meter 244, and it will further be seen that with any given pH of the sample passing through the glass electrode 17, there will be a position of the potentiometer slider 196 at which the potential generated by the sample and modified by the temperature correction bridges will be exactly balanced, under which circumstances there will be no change in the reading of the meter 244 as the switch blade 232 is moved from contact to contact, and by this means, therefore, the pH of the solution can be read from the potentiometer 195.

An alternative construction is shown in Fig. 14, wherein the conductor 173 is continuously connected to condenser 233 and thence to grid 234 of the input tube. A switch 232a is normally open as indicated, under which condition the plate of condenser 233 is at the same potential as conductor 173. When switch 232a is closed, the potential on said condenser will alter to that of conductor 248, and there will occur a change in potential in grid 234 unless the potential and all potentials exactly balance, in which case conductors 173 and 248 will be at the same potential and no change in potential of grid 234 will occur as switch 232a is functioned. Condenser 274a shunts switch 232a and serves the dual function of absorbing any contact potential generated at contacts when switch 232a is closed and decreasing the rate of change of potential of connector plate of condenser 233 when switch 232a is opened, thus eliminating extraneous potentials in both operations.

In practice, it is frequently desirable to locate the potentiometer and amplifier at some distance from the cell chain proper, and under these circumstances potentials may be generated in conductor 173 by virtue of electronic or electro-magnetic fields, and if said potentials are transferred to grid 234 when switch blade 232 is moved to the contact 228, there will occur in meter 244 reactions independent of their relationships to the potential of the cell chain to that of potentiometer, that is, the instrument will become sensitive to stray fields. I have found, however, that the effect of stray field interference can be almost completely nullified by utilization of a high impedance located at 226 and condensers 245 and 246. Such a combination constitutes a filter network, and I have found that when resistance 226 is approximately 10 megohms, and condensers 245 and 246 are approximately 0.002 microfarad, that even extreme interference can be eliminated.

It is to be noted that both condensers 245 and 246 return to a point at McClure potential, and it will be recalled that McClure potential is the same as the potential of conductor 173 at the condition of balance. Consequently, under these circumstances, it is impossible for electrical leakage to occur through condensers 245 and 246. I have also found it advisable to use a third condenser 247, one side being connected between the switch blade 232 and the condenser 233, and the other side connected to the McClure circuit as indicated at 248. I have found that by so doing extraneous contact potentials produced when the switch blade moves between the contacts 229 and 228 are largely eliminated. The condensers 245, 246 and 247 are in this instance 0.002 mf. condensers.

*pH recorder and controller*

In Figs. 8 and 9 I have shown the invention as embodied in an automatic indicating, recording and controlling mechanism wherein the cell chain and the temperature compensation bridges A and B are identical with the form shown in Figs. 1 to 7, inclusive, and wherein the potentiometer assembly and thermodynamic temperature compensation is substantially similar in principle to that of Figure 1 with the exception of certain changes in the circuit necessitated by the additional functions to be performed. This embodiment includes a potentiometer assembly designated generally by the numeral 248, a power operated switching recording and potentiometer adjusting mechanism indicated generally by the numeral 249, an amplifier system 251 (Fig. 9) and a power supply 252.

*Potentiometer assembly Fig. 8*

This potentiometer assembly is similar in principle to that of Fig. 1 and employs the resistance 193, the slide wire potentiometer 195, the resistances 204 and 201 and the variable resistances 197 and 206 arranged in the same relationship. However, in this instance the slider 219 of the resistance 197 is connected to McClure circuit by means of a conductor 253, in this instance connected to the metallic shield 175 around the lead from the glass electrode. Furthermore, the standard cell 221 is in this instance connected into the conductor 214 between the resistance 204 and the working battery 209, and is connected to a switch 254 having two positions designated as standardized and operate, the common pole of this switch being connected to a galvanometer as will presently be described. A second switch 255 having an open position for operation and a closed position for standardizing is interposed between the conductor 199 of the potentiometer assembly and a conductor 256 of the galvanometer circuit. The potentiometer circuit in this instance also has a temperature responsive coil 225 heretofore described and functioning in the same manner. In this instance the slider 196 of the potentiometer 195 is mechanically operated by suitable means from the driving mechanism 249, in this instance shown as a rod 257. A galvanometer 258 is, in this instance, used to balance the potentiometer circuit and is connected across resistance 204 by placing switches 254 and 255 in the standardized position in which they connect to the galvanometer through conductors 259 and 261. In the Operate position the galvanometer is fed by way of conductors 256, 261, 259 and 262 through elements presently to be described from the output of the impulse amplifier 251. Resistors 263 and 264 are used to adjust the galvanometer needle in accordance with the response of the particular amplifier and galvanometer coil employed, as will be understood in the art, the resistor 263 being known as a critical dampening resistance.

*Motor operated switching unit*

The motor operated switching recording and potentiometer adjusting unit 249 includes a motor 265 arranged to drive a shaft 266. The shaft 266 drives a further shaft 268 which in turn has a gearing 269 driving a shaft 271, which in turn drives a sprocketed roller 272 through gearing 273. The roller 272 has a sheet of recording paper 274 trained thereover from a supply roll 275 upon which the results of the test are continuously recorded by a pen 276 or other analogous device well known in the art. A cable or cord 277 is trained over pulleys 278, 279, 281 and 282 and carries the pen 276, the cable being given a turn around a pulley 283 positioned on the shaft 257 so that the pen will be moved longitudinally of the roller 272 in one direction or another in response to rotation of the shaft 257 so as to produce a line on the paper 274 in response to continuous movement thereof under the action of the motor 265. The mechanism just described, together with certain parts of the following description, is a recording mechanism of well known design such as that shown in Fig. 6 of Keeler Patent 1,472,125, issued October 30, 1923. It will be understood that this is only by way of illustration, and the principle of the invention may be applied to any well known type of recording device, numerous of which are known to the art. In this particular form, the shaft 268 carries spaced cams 284 and 285 fixed thereon and intermediate cams 286 and 287. A lever 288 is pivoted near its upper end and depends in a position to be actuated by the cam 287, and an arm 289 is pivoted thereon on a horizontal axis adjacent the lower end thereof, each end of the arm carrying a shoe 291 of cork or other suitable material for frictionally engaging the rim 292 of a clutch disk or wheel 293 fixedly secured on the end of the shaft 257. The cam 287 periodically engages the lever 288 to move it outwardly away from the disk 293 in opposition to a spring, not shown, thereby lifting the shoes 291 free from the rim 292 to permit rotation of the arm under the influence of the cam 287, the spring returning the shoes into engagement with the rim upon release from the cam. After the cam 287 has lifted the shoes from the rim, the cam 286 engages the end 294 of the lever 295 which is fixedly secured at its upper end to a bar 296 pivoted at its opposite ends as shown at 297. A jaw member 298 is secured to the upper edge of the bar 296 and has an upper edge which is inclined and increases in height toward each side as shown at 299. The needle 301 of the galvanometer 259 extends immediately above the edge 299, the needle being deflected by the movable coil 302 or other operating device of the galvanometer or analogous potential measuring mechanism. Abutments such as that shown at 303 at the ends of the surface 299 serve to limit the deflection of the needle 301. Above the needle, and beneath which it normally freely swings are the jaws 304 and 305 preferably having straight and horizontal lower edges, the jaws being pivoted as shown at 306 and extending toward each other leaving a gap of sufficient width between their inner ends to allow free entry of the needle 301 when in mid position, the needle normally swinging between the edges 299 and the lower edges of the jaws 304 and 305, the latter of which have downwardly extending arms 307 and 308 drawn toward each other by a spring 309. Attached to the lower end of the lever 288 is a plate 311 carrying pins 312 and 313 cooperating with the lower ends of members 307 and 308. At opposite ends of the arm 289 are lugs 313 and 314 adapted to be engaged by the cams 284 and 285. In operation, the needle 301 may be deflected either toward the right or left facing Fig. 8 from the central position. Assuming, for example, the needle to be deflected toward the right, the periodical vertical movement of the bar 296 by cam 286 driven by shaft 268 permits the needle to move between the edge 299 and the lower edge of jaw 304, in which position it will be clamped causing the right hand arm 307 to be tilted on its pivot in a clockwise direction, thereby pushing on the pin 312 of plate 311 to tilt the movable or driving clutch arm 289 in a clockwise direction while cam 287 holds the shoes 291 away from the rim 292, the extent and direction of angular movement of the member 289 being dependent upon the degree of deflection of the needle 301 under the influence of the galvanometer, and consequently dependent upon the extent of unbalancing of the circuits, as will presently appear. The cam 287 shortly releases the shoes 291 in response to further rotation of the shaft 268, which again grip the ring 292. With continued rotation of the shaft 268 the cam 285 engages the lug 314 pushing it downwardly and restoring arm 289 to horizontal position during which movement the arm 289 rotates the disk 293 in counterclockwise direction, thereby rotating shaft 257 in like direction. During this movement the slider 196 of potentiometer 195 is likewise moved through an equal arc so as to re-balance or tend to re-balance the potentiometer circuit. During this movement of the shaft 257, the pen 276 is likewise given corresponding movement on the chart 274. When the needle 301 moves to the left from this central position, analogous operation occurs, causing rotation of the shaft 257 in the opposite direction. During this movement of the shaft 257 under the influence of the galvanometer, a brush 315 is brought into engagement with one or other of segments 316 and 317 connected by conductors 318 and 319 to a motorized valve 321, the brush 315 likewise being connected to the motorized valve through conductors 322 and 323 and battery or other source of power 324. The motorized valve 321 is of the type common in the art having a valve proper and a motor arranged to index the valve in either direction to increase or decrease the flow therethrough. The valve 321 controls the flow through a pipe 325 from a source of supply 326 of a reagent for adjusting the pH of the solution in the container 71. It will be understood that the valve 321 and associated circuit are by way of illustration, and that there may be substituted therefor the usual and common types of control mechanism, alarms or signal mechanism to be operated in response to change in pH of the sample.

Mounted on the end of the shaft 268 is a cam 327 positioned thereon in such manner as to depress a multiple switch 328 during the interval when cam 287 has the shoes 291 raised from the rim 292. The switch 328 consists of blades supporting contacts 329, 331 and 332. In the position shown in Fig. 8, galvanometer 258 is open except for its critical dampening resistance 263, while feed condensers 333 and 334 (Fig. 9) are shorted through contacts 331, conductors 335 and 336 and resistance 337, which resistance is substantially equal to the resistance of the galvanometer and its critical dampening resistance 263. As switch 328 is actuated by the cam 327, contacts 331 are opened, and contacts 332 are closed, thus connecting the galvanometer and the critical dampening resistance with condensers 333 and 334 (Fig. 9) which are included in the output circuit of the amplifier. Subsequent to closure of contacts 332 there occurs closure of contacts 329, which produces a pulse in the amplifier circuit if the potential circuit is not in balance by means hereinafter described. At the same time resistance 337 is taken out of the galvanometer circuit. This method of switching has a decided advantage in that a load is applied to the condensers 333 and 334 at all times so that there is no opportunity for an electrical charge to build up when these elements are not connected to the galvanometer, while at the same time the galvanometer is allowed to return to its mechanical zero. By substituting the resistance 337 for the galvanometer during the remainder of the cycle the galvanometer is allowed maximum time in which to return to rest, while any potential applied to the condensers subsequent to the first pulse delivered from the amplifier is dissipated in the resistance 337, and this circuit comes to equilibrium before the galvanometer is again connected on the next cycle. Accordingly, at the instant contacts 332 are closed, the galvanometer is in a condition of mechanical rest and there exists practically zero potential between conductors 335 and 336. The amplifier has had opportunity to return to normal subsequent to the previous cycle, and the entire system is prepared to respond to any difference in potential that may exist between the cell chain and the potentiometer circuit at the instant they are connected to the amplifier system.

*Amplifier and power supply system of Fig. 9*

Connection of the cell chain and the potentiometer circuit to the amplifier system occurs when contacts 329 are closed, the blades being set so that this occurs immediately subsequent to closure of contacts 332. Closing of contacts 329 completes the circuit through a relay designated generally by the numeral 338 shown more in detail in Fig. 9 from true ground by way of conductors 339, 341, contacts 329, a conductor 342, a resistor 343, relay 338, a conductor 344 to one side of a source of direct current, indicated in Fig. 9, by rectifier 345, and thence through conductors 346, 347 and 348 to true ground. Relay 338 is also continuously energized from rectifier 345 by way of conductors 349, 351, 352 and 353, resistance 354, relay 338, and conductor 344, the energy thus continuously fed to the relay being insufficient either to close or to maintain the relay in the closed position unless current is also fed to the relay through contact 329, as above described. This construction minimizes the flux increment in the relay necessary for operation thereof, thereby minimizing extraneous potentials from this source in the grid circuit of the first tube. The relay is operated under conditions of minimum flux increment in order to minimize as far as possible stray fields from the relay armature cutting the grid circuit of the first tube which is handled on the same relay, thereby preventing a pulse being generated in the amplifier as a direct result of changes in flux of the relay core.

Referring to Fig. 10, the details of the relay are therein shown. The relay frame is maintained at McClure potential by a connection thereto and the assembly is insulated from ground by mounting on an insulating block 340 which in turn is mounted to the case 340a connected to true ground. Inasmuch as the frame of the relay and the assembly supporting the relay switch blades are at McClure potential at the point of potentiometer balance, there can be no leakage from these switch blades for reasons already explained. Further, I have found that a relay of the so-called telephone type as shown in Fig. 10 is particularly suitable for this purpose since its metal frame is parallel to the switch blades and magnetic flux leakage from said frame will, therefore, induce the minimum potential in the switch blades when said flux is altered.

The grid 355 of the first tube designated generally by 356 is connected to ground through conductors 357 and 358 and grid leak 359 and is connected to one contact of the relay 338 through conductor 357, condenser 361, and switch element 362. In the normal de-energized position of the relay, the switch element 362 contacts switch element 363 connecting the grid 355 to the McClure circuit by way of conductor 357, condenser 361, contacts 363, conductors 364, 365 and 366. A condenser 350 connects the McClure circuit to true ground by way of conductors 366 and 365, a conductor 350a, condenser 350, a conductor 350b, a conductor 417 and conductors 352, 351, 349, 346, 347 and 348. The purpose of this condenser is threefold: first, it completes the cell circuit to the ground side of grid leak 359 by way of conductor 416; secondly, it by-passes any static charges or transients that may develop in the circuits external to the amplifier 251, and thirdly, it acts as a blocking condenser, protecting the reference electrode 14 (Fig. 8) from becoming short circuited in the event that the solution in the tank 50 becomes grounded. When contacts 329 close, relay 338 is energized and completes circuit through the switch 362 by way of contact 367 connecting condenser 361 to glass electrode lead 173 by way of conductor 368 and resistance 369. When the potential of the potentiometer assembly balances the potential of the cell chain as modified by the temperature compensation bridges A and B, the potential of the conductor 173 and of the shield 175 is equal, and under these circumstances when switch 362 moves from engagement with contact 363 into engagement with contact 367, no change in potential is imparted to the condenser 361, and there is accordingly no change in potential exerted on grid 355 of tube 356. However, if the output of the potentiometer assembly fails to balance the potential of the cell chain as modified, then when switch 362 is actuated to move out of engagement with contact 363 and into engagement with contact 367, a charge will be imparted to the grid 355 from condenser 361, and this charge will be amplified through the cascade including the vacuum tubes 356, 371 and 372, and will appear as a difference in potential at condensers 333 and 334, causing a difference in potential between conductors 335 and 336, which difference is transferred to the galvanometer 258 by way of conductors 335, 256, 261, coil 302, conductor 259, switch 254, conductor 262, resistance 264, contacts 332 and conductor 336. The resultant swing in the galvanometer needle 301 occurs just prior to the lifting of the chopper bar 296. Thus, as the cam 327 actuates switch 328 there will, at unbalanced condition of the instrument, simultaneously occur a pulse of energy through the galvanometer resulting from the out of balance potential amplified through the cascade, and this pulse will move the galvanometer needle 301 so that as the chopper bar 296 rises immediately subsequent to closure of switch 328, the galvanometer needle will function to actuate members 307 or 308 of the recording device. Condensers 330 (Fig. 8) are connected through resistor 264, conductor 262, switch 254, and conductors 259, 261 and 256 across the galvanometer 258. In this instance these condensers are of the electrolytic type, and for this reason two condensers are employed in opposition. This condenser system acts as a storage reservoir for impulses received from the amplifier over conductors 235 and 236 and discharge through resistor 264 into the galvanometer coil 302 by way of the conductors above mentioned. This construction is employed because it is desirable to feed the galvanometer with a pulse whose character is determined by the time constant of the galvanometer, and this is accomplished by proportioning condensers 330 and resistor 264 so as to materially prolong the excursion of the galvanometer needle 301 and allow maximum time for the chopper bar to close and grasp the deflected needle. As the cam 327 continues to advance from the position at which contacts 329 and 332 are first closed, the chopper bar 296 locks the galvanometer needle, and subsequent to this locking operation, cam 327 advances still further until switch 328 is released and returns to the position shown in Fig. 8. It will be seen that any electrical impulse imparted to the grid of the first tube as a result of opening contact 329, or any impulse imparted to the galvanometer coil during the opening of contacts 332 and the closing of contacts 331, cannot be reflected by any change in the position of galvanometer needle 301 since the needle is mechanically locked in position by the chopper bar during this portion of the cycle. Upon release of the galvanometer needle, contacts 331 have been closed and contacts 332 opened, and therefore, the galvanometer is then connected only to its critical damping resistance and returns to the position of rest in the minimum time. Any electrical pulse generated in the amplifier because of the opening of contacts 329 are absorbed in resistance 337, and by the time cam 327 is again advanced to a position to operate switch 328, the entire amplifier and galvanometer system has returned to normal.

In operating the amplifier from ordinary voltage supplies, I have found it advisable to take certain precautions to stabilize the voltages fed to the amplifier circuit. In Fig. 9 I have shown a 110 volt 60 cycle power supply indicated by lines 373 connected through a switch 374 to primaries 375 and 376 of transformers 377 and 378. Condensers 379 and 381 are connected across the power supply lines 373 and carried to ground through conductor 382, these condensers being approximately 0.01 mfd. This compensates to some extent for high frequency transit potentials entering through the supply lines. Transformer 375 has a secondary 383 and may be any one of the so-called constant voltage type devices or any other device for delivering an output of substantially constant potential in spite of variable potential on the input. The filaments of all of the tubes in the cascade are fed from this transformer through conductors 384 and 385 returning to ground by way of conductor 339 and from ground returning to the secondary of the transformer by way of conductor 386. Transformer 378 has a secondary 387 arranged to feed the rectifier 345 through conductors 388 and 389, which serves as a source of power for relay 338. Another secondary 391 on the same transformer serves to energize the filament of a standard rectifier tube designated generally by the numeral 392, such as the tube known commercially as an "80" by way of conductors 393, 394 and 395. A third secondary 396 on the transformer 378 delivers high potential alternating current through conductors 397 and 398 to rectifier tube 392 where it is rectified, the positive terminal of said rectifier delivering to filter choke 399, and the negative side of the rectifier system being connected by conductor 401 to ground by way of conductors 349, 346, 347 and 348. The point 402 on the output side of the filter 399 therefore becomes the so-called B plus of the rectifier system, and condenser 403 is connected between the conductor 394 and the ground wire 400, while a condenser 404 is connected between the point 402 and the ground wire 400, these connections being made by conductors 405 and 406.

The B plus voltage is delivered by way of conductor 407 to a point 408, and thence through resistors 409, 411 and 412 and conductor 413 to the plate 414 of the first tube of the cascade, the cathode of the tube 356 being connected to ground through resistance 415, conductors 416 and 417 to ground wire 352. This resistance should preferably be variable in order to simplify the initial adjustment of the amplifier. The screen grid 418 of the first tube is energized through conductor 419 and resistor 421, and resistors 411 and 409 connected to the point 408 at which the B plus supply is connected. Connected at the point 422 between resistors 411 and 421 is a resistor 423, and connected to ground through conductor 424 and variable resistance 415 and utilized to develop on the resistance 415 a sufficient potential drop so that the cathode will be properly biased with respect to the grid 355 of the first tube. A resistor 425 connects between conductor 419 and the ground wires 416 and 417 acting as a bleeder to stabilize the potential at the screen grid 418 to the required value. On the B plus supply between the resistors 409 and 411 is connected a voltage regulator tube 426, the opposite side of this tube being returned to ground by connection to ground conductor 416 and 417 by a conductor 427. The tube 426 is of the gaseous discharge type characterized by substantially constant voltage drop across its terminals over wide ranges of current flow, its function being to stabilize the plate and screen potentials for the first tube. The function of resistor 411 is to produce the required voltage at the point 422.

A conductor 431 branches from conductor 413 and feeds through a condenser 432 and conductor 433 to grid 434 of the second tube 371. Potential increments appearing at conductor 413 consequently will be reflected in grid 434 of the second tube, this being a standard capacity connected amplifier circuit. Grid 434 of the second tube is also connected by conductor 435 and grid leak 436 to ground by conductors 437, 438 and 439. Resistor 441 constitutes a bleeder from positive B at point 402 through a conductor 442 to ground by way of a conductor 443, and is tapped at point 444, conductors 445 and 446 and resistance 447 delivering to the cathode 448 of said second tube, resistance 447 acting as a bleeder delivering to ground through a variable resistance 449 and conductors 450, 437, 438 and 439, the potential generated across resistance 449 constituting the grid bias on the second tube. A resistor 451 is connected at one end to conductor 446 and to the grid 452a of tube 371 by conductor 452, a bleeder 453 to ground insuring the proper potential on conductor 452. Conductor 446 is branched at the point 454 to form conductor 455, from which are fed resistors 456, 457 and 458. Resistor 456 constitutes the plate resistor of the second tube, being connected to the plate 459 thereof by conductor 461. Variations in the potential of conductor 461 are consequently reflected by a condenser 462 connected thereto by conductor 460 and thence through a conductor 463 to grid 464 of the third tube 372, this also being a standard capacity coupling between tubes.

The ratio of resistance 447 to 449 is such that when a change in potential occurs between point 465 and ground, the increment of potential drop thereby reflected in resistance 449 will cause a change in bias on the second tube of such magnitude as to substantially compensate for the change in plate current in the second tube which would otherwise occur, that is, the resistances 447 and 449 are so proportioned that when change in potential at point 465 occurs, there will not occur a corresponding change in potential in conductor 452 so that changes in B voltage due to line voltage fluctuations will not be reflected by a change in potential of the grid of the third tube by virtue of changes in potential occurring at point 465.

From a point 466 of bleeder resistor 441, conductor 467 delivers to resistors 468 and 469, and from resistor 468, conductor 471 branches at point 472 and delivers to resistor 473 and through a conductor 474 to condenser 334. From resistor 473 a conductor 475 delivers through resistor 458 to conductor 455. Grid 464 of the third tube is connected by a conductor 476 to grid leak 457 delivering to conductor 455. Potential drop through resistor 458 accordingly constitutes the bias on the grid of the third tube, and it will be apparent that the cathode 477 of the third tube connected thereto by conductor 478 operates at considerably above ground potential. The function of resistor 473 is dual in nature. It acts to supply current to resistor 458 via conductor 475 of such magnitude that the proper grid bias is applied to the third tube. Refer now to point 479 on conductor 467. This constitutes the point of connection of one conjugate conductor of a Wheatstone bridge, the point of connection of the other conjugate conductor being the point 481 at which conductor 475 meets conductor 478. The arms of said bridge then constitute first the resistor 469, second the primary 482 of a transformer 483 and a condenser 484 in parallel and connected to the plate 485 by tube 372 by conductor 486, and said combination in series with the plate cathode resistances of the tube returning from said cathode to conjugate point 481. Condenser 333 is connected at point 487, a third conjugate point of said bridge. The resistor 473 connected between points 481 and 472 constitutes a third arm of said bridge, while the point 472 constitutes the fourth conjugate point to which is connected condenser 334. The fourth arm of said bridge consists of resistor 468. The purpose of this bridge combination is to maintain points 472 and 487 at substantially the same potential with changes of B supply at point 466, since in this manner condensers 333 and 334 are therefore both at substantially the same potential when no pulse is being amplified and there is accordingly substantially no tendency for leakage to occur through said condensers and into the galvanometer circuit.

While points 487 and 472 are normally at substantially the same potential, these potentials may not be exactly in balance, in which case serious error may occur if, concurrently, the ohmic leakage through condensers 333 and 334 allows a continuous current to flow through the galvanometer circuit when contacts 332 are closed. This possibility can be completely avoided in the manner shown in Fig. 11 wherein dual condensers 333 and 333a replace condenser 333 on conductor 336 while 334 and 334a replace condenser 334 on conductor 335. A high resistance 340 connected between the junction of 333 and 333a and the junction of 334 and 334a effectively bleeds any ohmic leakage away from the galvanometer circuit without appreciably interfering with the effectiveness of the condenser system in transmitting pulses.

This bridge circuit may be explained in another way by saying that resistances 468, 473, 469, etc., are so proportioned that the potential at 472 is normally the same as the potential at 487, under which circumstances the plates of the condensers connected to these points are at substantially the same potential, and consequently there occurs no tendency for leakage through the galvanometer when connected to the opposite plates of condensers 333 and 334. Conductor 419 leading to grid 418 of the first tube is connected to a condenser 488, the opposite side of said condenser being connected to the filament circuit of the same tube, and since this filament circuit is supplied with alternating current, there is impressed on grid 418 an alternating potential via condenser 488. This potential is amplified in the first, second and third tubes, and appears as amplified A. C. on the plate of the third tube where it is fed to the combination of primary inductance 482 and associated condenser 484 of a transformer 483. This inductance and capacitance are so proportioned that their parallel combination exerts a maximum impedance to the particular frequency fed through the condenser 488, and it will be recognized that this particular frequency is far removed from the frequency of the pulse generated in the cascade when relay member 362 is moved from contact 363 to contact 367. Consequently, while the combination acts as a very high impedance to the signal entering the circuit through condenser 488, it does not materially impede the pulse signal generated by closure of the relay. The secondary 489 of the transformer will consequently continuously deliver alternating current of the frequency passed by condenser 488 when the amplifier is functioning normally. One side of the secondary 489 is connected to ground by conductors 491 and 339 and a conductor 492 connects to the opposite side of said secondary and delivers to grid 493 of a fourth vacuum tube 494. The plate 495 of this tube is connected to B voltage at 408 by a conductor 496 and a plate resistor 497, while a bleeder 498 connected between the point 408 and ground by conductor 499 is tapped at the point 501 and connected by conductor 502 to screen grid 503 in the same tube. Bleeder 498 is further tapped at point 504 and is connected from this point to the cathode 505 of the tube by conductor 506, thereby supplying the proper bias with respect to grid. A condenser 507 connected between the cathode and ground wire 499 further improves the gain of this tube by reducing cathode degeneration. Connected to the plate lead 496 is a condenser 508 connected in series with a glow lamp such as a neon bulb 509 and thence to ground by conductors 511 and 439. It will be apparent, therefore, that when the amplifier system is functioning normally, the alternating current impressed through condenser 488 onto screen grid 418 of the first tube will be amplified successively in the first, second, third and fourth tube and will appear as a greatly amplified A. C. signal of the same frequency on the plate lead 496 of the fourth tube. From this point the alternating current component will pass condenser 508 and cause the neon light 509 to glow. If, however, any tube in the circuit becomes inoperative or if any other element of the amplification system fails, the alternating signal impressed by condenser 488 will fail to amplify and appear at neon bulb 509, and failure of the amplifier will thereby be immediately evidenced. Further, bulb 509 being a neon lamp requires a minimum voltage before it begins to glow so that in the event gradual failure of overall amplification factor of the cascade occurs, the neon light will continue to light until the amplification factor of the cascade falls to a predetermined minimum, at which point the light will sharply go out. The signal circuit, therefore, gives a sharp indication when the overall amplification factor of the cascade falls below a preselected minimum. This is a very important factor in industrial equipment, since there is immediate response in the event of failure of any element in the circuit. Further, in the event large potentials are impressed on grid 355 by virtue of extreme out-of-balance conditions between the potentiometer and the cell chain and its associated temperature compensators, there will occur momentary blocking of the grid in one or more of the first three tubes in the cascade, and such blocking will immediately be evidenced by failure of the signal light. The light, therefore, discloses not only satisfactory operation of the amplifier itself, but also indicates if abnormal conditions exist in the potentiometer or cell chain circuit, such, for example, as a failure of the glass electrode, failure of a control valve, shorted leads, etc.

Referring further to the input circuit of the first tube, resistance 369 is of high impedance and by-passing this resistance to the McClure circuit is a condenser 512. This combination constitutes a filter circuit such as that described in detail in connection with Fig. 1, resistance 369 of Fig. 9 corresponding to resistance 226 of Fig.

1, and condenser 512 of Fig. 9 corresponding to condenser 245 of Fig. 1. This filter circuit serves to prevent the entrance of the amplifier of extraneous stray signals generated in conductor 173 or in parts of the potentiometer cell chain circuit.

It will be recognized by those skilled in the art that the amplifier system herewith disclosed need not be restricted to the particular number of tubes illustrated. In certain instances a lesser number of tubes may be satisfactory, while in other cases more tubes might be employed and such other combinations may be made within the scope of this invention.

Referring now more particularly to Fig. 12, I have therein shown power operated means for cleaning the electrode, to which device reference has already been made. In this construction the brush 71 is caused to extend from a point above the conductive layer 69 to a point below the conductive layer 68 and the handle or stem thereof extends upward through the fitting 34, a bushing 515 being positioned in the bore 37 for the reception of a bearing 516 on the brush stem. A motor 517 of conventional design is supported on the fitting 34 by means of a bracket 518 and screws 519, the bracket and screws being insulated from the bushing by means of insulated plates 521. The bearing member 516 is connected to and driven by the motor. Interposed between the motor and a source of power 522 are switch contacts 523 positioned on switch 328 (Fig. 8) and actuated by means of the cam 327 in such manner that the contacts 523 are closed during the same period as the contacts 331 and opened when these contacts are open so that the motor 517 operates to rotate the brush during the interval between tests. The density of the bristles on the brush 71 must, of course, be such as not to materially interfere with the flow of sample through the electrode.

In Fig. 13 I have shown means for automatically replacing the liquid junction at 63 (Figs. 3 and 4). This device includes a cylinder 524 having a threaded outlet end 525 somewhat similar in nature to the threaded outlet 89 of tube 91 (Fig. 3) adapted to be threaded into the member 87 in place of the collapsible metal tube 91 of Fig. 3 and adapted to hold a supply of bridge material indicated at 526. A plunger 527 is positioned in the cylinder 524 and has a threaded stem 528 upon which is positioned a worm wheel 529 secured against lateral movement and rotated by means of a reduction gear train indicated generally by the numeral 531 and driven by a motor 532 connected to a source of power by leads 533. If desired, switch contacts similar to contacts 523 of Fig. 12 may be interposed in this power supply for the purpose of intermittently actuating the motor and feeding the bridge material to the liquid junction in a step-by-step fashion. As shown, the mechanism continuously feeds bridge material, the gear train 531 being such as to very slowly advance the plunger 527 and continuously replace the bridge material.

While any suitable form of bridge material may be employed, I have found it particularly desirable to employ a novel type of bridge material in the form of a plastic composition incapable of flowing under its own hydrostatic pressure. A suitable material is formed by heating together one hundred grams of water, two grams of agar over a steam bath until the mixture is clear. Thereupon about thirty grams of potassium chloride is dissolved therein and the mass allowed to cool and remain quiescent until a gel is well established. The gel mass is then forced through a mesh screen to rupture the gel and render the mass plastic. This latter step breaks up the gel into small particles rendering the same sufficiently plastic to flow under moderate pressure. I have found, however, that a preferred type of composition results from the use in the combination of a plasticizer such as glycerol, ethylene glycol, diethylene glycol, or sulphonated castor oil. This is desirable since it avoids the difficulty heretofore associated with the use of bridge materials in their tendency to seep out and dry around the edges of a stop cock or at the junction of tubes. When such a plasticizer is used the gel remains permanently plastic and the above mentioned difficulties are not encountered. This preferred type of composition can be made as follows: About 30 grams of agar and 180 cc. of water are heated over a water bath until clear. About 2 grams of methyl cellulose is then added to the solution near its boiling point and allowed to cool with stirring until the cellulose peptizes and the solution becomes smooth and free of lumps. About 20 cc. of glycerine are then added and the mass reheated, whereupon about 60 grams of potassium chloride and about 100 grams of barium sulphate are added and the mass stirred until the chloride is dissolved and the sulphate is well dispersed. Material is then cooled and well stirred just before the setting temperature is reached. The material is then allowed to stand to produce a gel and when gelled, is forced through a mesh screen having a mesh size in accordance with the degree of plasticity required, approximately thirty mesh screen being satisfactory for use in the apparatus herein disclosed.

While I have thus described and illustrated specific embodiments of the invention it will be understood that this is by way of illustration and not limitation, and I do not wish to be limited except as required by the prior art and the scope of the appended claims, in which—

I claim:

1. The combination in an ion activity measurement device of an electrolytic cell chain for producing a potential proportional to an electrochemical characteristic of a test sample, means for applying a correction potential to the potential of said cell chain to correct the same for variations thereof due to changes of said characteristic caused solely by variation in the temperature of said sample from a reference temperature, and means for measuring the modified output of said cell chain.

2. The combination in an ion activity measurement device of an electrolytic cell chain for producing a potential proportional to a characteristic of a test sample, means for applying a correction potential to the potential of said cell chain to correct the same for variations of said characteristic due to variation in the temperature of said sample, means for measuring the modified output of said cell chain, and means for modifying said last mentioned means to produce a response proportional to the absolute temperature of said sample to measure said characteristic of said sample.

3. The combination in an ion activity measurement device of an electrolytic cell chain for producing a potential proportional to an electrochemical characteristic of a test sample at a pre-selected temperature, means for applying a correction potential to the potential of said cell chain to correct the same for variations thereof due to changes of said characteristic caused solely by variation in temperature of said sample from said temperature, and means including an electronic amplifier for measuring the modified output of said cell chain to measure said characteristic.

4. The combination in an ion activity measurement device of an electrolytic cell chain for producing a potential proportional to a characteristic of a test sample, means for applying a correction potential to the potential of said cell chain to correct the same for variations of said characteristic due to variation in temperature of said sample, means including an electronic amplifier for measuring the modified output of said cell chain, and means for modifying said last mentioned means to produce a response proportional to the absolute temperature of said sample to measure said characteristic.

5. The combination in a potential measurement device of, a source of unknown potential, means for balancing said potential against a standard source of potential, an impulse amplifier for determining the point of balance of said last mentioned means, to measure said unknown potential including contact means for completing electrical circuit between said source and said balancing means exclusive of said amplifier for producing a measurement impulse, a condenser shunting said contact means for reducing extraneous contact potentials, and means comprising a filter network between said source and said contact means for preventing stray field interference from entering the amplifier.

6. The combination in an ion activity measurement device, of an electrolytic cell chain for producing a potential proportional to a characteristic of a test sample including a test electrode and a reference electrode, means for applying a correction potential to the potential of said cell chain to correct the same for variations of said characteristic due to change in temperature of said sample, means for applying a correction potential to the potential of said cell chain for variations therein due to change in temperature of said reference electrode, and means for measuring the corrected output of said cell chain to measure said characteristic.

7. The combination recited in claim 1 including means for indicating the degree of correction potential applied to the potential of said cell chain.

8. The combination in an ion activity measurement device, of an electrolytic cell chain for producing a potential proportional to a characteristic of a test sample including a test electrode and a reference electrode, means for applying a correction potential to the potential of said cell chain to correct the same for variations of said characteristic due to change in temperature of said sample, means including an electronic amplifier for measuring said corrected potential, a conductor between said test electrode and said last mentioned means, a shield for said conductor, and means to bring the shield to substantially the potential of said conductor to prevent leakage between said conductor and shield during measurement.

9. The combination in an ion activity measurement device of an electrolyte cell chain for producing a potential proportional to a characteristic of a test sample including a test electrode, means including an electronic amplifier for measuring said potential, a conductor between said test electrode and said last mentioned means, a shield for said conductor, a circuit including said shield for bringing the latter to the same potential as said conductor during measurement, and means in said conductor substantially at said amplifier for preventing stray potentials on said conductor from entering said amplifier comprising a high impedance in said conductor, and a condenser connected to said conductor between said impedance and said test electrode and connected to said circuit.

10. The combination in an ion activity measurement device, of an electrolytic cell chain for producing a potential proportional to a characteristic of a test sample including a test electrode, means for applying a correction potential to the potential of said cell chain to correct the same for variations of said characteristic due to change in temperature of said sample, means including an electronic amplifier for measuring said corrected potential, a conductor between said test electrode and said last mentioned means, a shield for said conductor, a circuit including said shield for bringing the latter to the same potential as said conductor during measurement, and means in said conductor substantially at said amplifier for preventing stray potentials on said conductor from entering said amplifier comprising a high impedance in said conductor and a condenser connected to said conductor between said impedance and said test electrode and connected to said circuit.

11. The combination in a hydrogen ion measurement device of a cell chain including a glass electrode comprising a glass tube, a temperature tube located adjacent thereto, means for circulating a test sample through said glass electrode and said temperature tube, means for applying a correction potential to the potential of said cell chain to correct the same for variations in pH due to change in temperature of said sample, said means including a temperature responsive element in thermally responsive relationship with said temperature tube, means for balancing a known potential against the modified output of said cell chain, means for further applying to said balancing means a potential proportional to the absolute temperature of said glass electrode comprising a temperature responsive element in thermally responsive relationship with said temperature tube, and means for determining the point of balance of said balancing means to measure the pH of said sample.

12. The combination in an ion activity measurement device of an electrolytic cell chain for producing a potential proportional to a characteristic of a test sample, means for balancing a known potential against the output of said cell chain, an impulse amplifier ohmically isolated and electrostatically connected to said cell chain for determining the point of balance of said last mentioned means, and means for periodically applying to said amplifier any unbalanced potential from said balancing means, adjusting said balancing means to the point of balance, and recording said point of balance to indicate and record changes in said characteristic.

13. The combination in an ion activity measurement device of an electrolytic cell chain, means for balancing a known potential against the output of said cell chain, an impulse amplifier ohmically isolated and electrostatically connected to said cell chain responsive to the condition of balance of said balancing means, and means for applying to the amplifier any unbalanced potential from said balancing means and adjusting the balancing means toward the point of balance in response to out-of-balance response of said amplifier.

14. The combination in an ion activity measurement device of an electrolytic cell chain, means for balancing a known potential against the output of said cell chain, an impulse amplifier ohmically isolated and electrostatically connected to said cell chain responsive to the condition of balance of said balancing means, means for periodically applying to said amplifier any unbalanced potential from said balancing means, and means driven by said last mentioned means responsive to out-of-balance response thereof for recording change in said condition and for adjusting said balancing means toward the point of balance.

15. The combination in an ion activity measurement device of an electrolytic cell chain, means for balancing a known potential against the output of said cell chain, an impulse amplifier ohmically isolated and electrostatically connected to said cell chain responsive to the condition of balance of said balancing means, continuous recording mechanism, a controlled mechanism, a controller for controlling said controlled mechanism, means for periodically applying to said amplifier any unbalanced potential from said balancing means and driving said recording mechanism, and means driven by said last mentioned means responsive to out-of-balance response thereof for adjusting said balancing means, said controller and said recording mechanism.

16. The combination in a continuous ion activity measurement device of a cell chain, means for passing test fluid in a continuous flow through the cell chain, means for balancing a known potential against the electrical output of said cell chain, an impulse amplifier ohmically isolated and electrostatically connected to said cell chain responsive to the condition of balance of said balancing means, and means for intermittently applying to the amplifier any unbalanced potential from said balancing means and for adjusting the balancing means toward the point of balance in response to out-of-balance response of said amplifier.

17. The combination in an ion activity measurement device of an electrolytic cell chain for producing a potential proportional to a characteristic of a test sample, means for applying a correction potential to the potential of the cell chain to correct for variations of said characteristics with change in temperature of said sample from a pre-selected temperature, means for balancing a known potential against the corrected output of said cell chain, an electronic amplifier responsive to the condition of balance of said balancing means, means for periodically applying to the amplifier any unbalanced potential from said balancing means and adjusting the balancing means to the point of balance, and recording means for recording changes in the balance point of said balancing means with time.

18. The combination in an automatic ion activity measurement device for continuous operation of a glass electrolytic cell chain for producing a potential proportional to the pH of a test sample, said chain having a continuing flow of sample therethrough, means for balancing a known potential against the output of said cell chain, an electronic amplifier responsive to the condition of balance of said balancing means, means for periodically applying to the amplifier any unbalanced potential from said balancing means and adjusting the balancing means to the point of balance, and power operated means for cleaning the active surface of said glass electrode in timed relation with the last mentioned means.

19. The combination in an automatic ion activity measurement device of an electrolytic cell chain for producing a potential proportional to the pH of a test sample including a glass electrode and a salt bridge having a junction with the sample, means for balancing a known potential against the output of said cell chain, an electronic amplifier responsive to the condition of balance of said balancing means, means for periodically applying to the amplifier any unbalanced potential from said balancing means and adjusting the balancing means to the point of balance, power operated means for cleaning the active surface of said glass electrode, power operated means for renewing the liquid junction, and means for initiating said cleaning means and said renewing means in sequence with said periodically applying means.

20. The combination in an ion activity measurement device having a potential source of a high impedance, a potential measuring device, an impedance connected to said measuring device, a conductor between said impedance and said source, a static shield around said conductor insulated therefrom, a condenser having one terminal connected to said conductor adjacent said impedance, and means for connecting said shield and the other terminal of said condenser to a point at substantially the same potential as said conductor to reduce the effect of stray fields on said measuring device.

21. The combination in an ion activity measurement device of a cell chain and temperature compensation unit comprising two substantially air tight enclosing members, means for securing said members together in spaced and insulated relationship, a test electrode and a temperature tube enclosed within one of said members, means for circulating test sample therethrough, temperature responsive elements positioned on said temperature tube having electrical conductors, an electrical conductor connected to said test electrode, means for carrying said conductors through the walls of said members in insulated and shielded relation thereto, a reference electrode in the other of said enclosing members having a temperature compensator element, means in said other enclosing member for supplying bridge material, and temperature compensation bridges located in said second member, means extending through the walls of said enclosing members in substantially air-tight relationship thereto for electrically connecting said conductors and bridges to a test device, and means within said second enclosing member for manually adjusting said bridges.

22. The combination in a potential measurement device of a potential source, means for balancing a known potential against the potential of said source, an amplifier having a galvanometer for determing the point of balance of said balancing means to measure said potential, a circuit connecting said amplifier to said galvanometer, said circuit having a condenser in each of the leads thereof, a resistance substantially equal to the resistance of said galvanometer, and a switch for simultaneously switching said galvanometer out of said circuit and said resistance into said circuit to bring the galvanometer to rest and maintain a constant load on said condensers.

23. The combination in an ion activity measurement device of an electrolytic cell chain for producing a potential proportional to a characteristic of a test sample, means including an electronic amplifier for measuring said potential to measure said characteristic, and means between said cell chain and said amplifier for preventing stray field interference in said amplifier comprising a high impedance in the conductor between said cell chain and said amplifier and a condenser connected to said conductor at a point which will shunt said interference around the electronic amplifier of said measurement device and said impedance.

24. The combination in an automatic ion activity device adapted to produce successive measurements upon a flowing sample, of a glass electrode cell chain for producing a potential proportional to the activity of a selected ion including an electrode in the form of a tube, means for producing a flow of sample therethrough, and electrical conductors attached in spaced relation to the outer surface of said tube, means for measuring the output of said cell chain to measure said characteristic, and means for preventing condensation of moisture on said glass electrode to inhibit the flow of current between said conductors.

25. The combination in an ion activity measurement device of an electrolytic cell chain including a glass electrode for producing a potential proportional to the pH of a test sample, means for applying a correction potential to the potential of said cell chain to correct for variations of the pH thereof with change in temperature of said sample from a preselected temperature, means for balancing a known potential against the corrected output of said cell chain, an electronic amplifier responsive to the condition of balance of said balancing means, means for periodically applying to the amplifier any unbalanced potential from said balancing means and adjusting the balancing means to the point of balance, means for modifying the balanced point of said balancing means with changes in absolute temperature of said glass electrode, and means for indicating changes in the balance point of said balancing means with time.

26. The combination in an ion activity measurement device of a glass electrode cell chain for producing a potential proportional to the activity of a selected ion of a test sample, said cell chain including a glass electrode in the form of a tube, means for producing a flow of sample through said tube, a plurality of bands of conductive material on the outer surface of said tube for establishing electrical contact therewith to measure said potential, and means for preventing condensation of moisture on the outer surface of said glass electrode to prevent leakage between said bands along the outer surface of said electrode.

27. The combination in an ion activity measurement device of an electrolytic cell chain for producing a potential proportional to a characteristic of a test sample, means for producing a potential equal and opposed to the potential of said cell chain, means for indicating balance of said cell chain and said potential producing means and a filter circuit comprising at least one condenser connected between the high resistance side of said cell chain and that conductor of said potential producing means which has the same potential as said high resistance lead when the potentials of the potential producing means and the cell chain are equal and opposed.

28. The combination recited in claim 27 wherein said filter circuit comprises, at least one resistance connected in series between the high resistance side of said cell and said indicating means, and at least one condenser one side of which is connected between the high resistance side of said cell chain and said indicating means and the other side of which is connected to that conductor of said potential producing means which has the same potential as said high resistance lead when the potentials of the cell chain and the potential producing means are equal and opposite.

29. The combination in an ion activity measurement device of a direct current potential source comprising an electrolytic cell chain, means for balancing a known direct current potential against the output of said cell chain, means for determining the point of balance of said last mentioned means including an impulse amplifier and a galvanometer, means for feeding a constant alternating current potential to said amplifier to indicate an operating characteristic of the amplifier, means between said amplifier and said galvanometer for selectively transmitting any pulse component of energy from said amplifier resulting from imperfect balance between said cell chain and said balancing means to said galvanometer, and means responsive to the resultant amplified alternating current potential for indicating when the amplifier fails to show gain above a preselected minimum.

30. The combination recited in claim 29 wherein the amplifier is adjusted so that the amplified alternating current potential is insufficient to actuate the last mentioned means when said pulse introduced by the difference between the cell chain potential and the balancing potential exceeds a preselected minimum.

EDWIN D. COLEMAN.